United States Patent [19]

DeLuca

[11] Patent Number: 5,910,295

[45] Date of Patent: Jun. 8, 1999

[54] CLOSED LOOP PROCESS FOR PRODUCING POLYCRYSTALLINE SILICON AND FUMED SILICA

[75] Inventor: John P. DeLuca, Chesterfield, Mo.

[73] Assignee: MEMC Electronic Materials, Inc., St. Peters, Mo.

[21] Appl. No.: 08/966,798

[22] Filed: Nov. 10, 1997

[51] Int. Cl.$^6$ .................................................. C01B 33/02
[52] U.S. Cl. ............................................ 423/337; 423/349
[58] Field of Search .................................... 423/348, 349, 423/350, 336, 342, 337

[56] References Cited

U.S. PATENT DOCUMENTS 4,092,446  5/1978  Padovani et al. ........................ 423/342

*Primary Examiner*—Michael Lewis
*Assistant Examiner*—Stuart L. Hendrickson
*Attorney, Agent, or Firm*—Senniger, Powers, Leavitt & Roedel

[57] ABSTRACT

A closed loop process for producing electronic grade polycrystalline silicon from silane and fume silica from silicon tetrachloride comprises the steps of:

(a) subjecting impure silicon to hydrochlorination with hydrogen chloride to produce trichlorosilane and silicon tetrachloride together with minor amounts of dichlorosilane and monochlorosilane;

(b) converting the trichlorosilane to silicon tetrachloride and silane;

(c) converting the silane to polycrystalline silicon and hydrogen;

(d) reacting the silicon tetrachloride from steps (a) and (b) with hydrogen and oxygen to produce fume silica and hydrogen chloride, and (e) recycling the hydrogen chloride from step (d) for use in step (a).

5 Claims, No Drawings

CLOSED LOOP PROCESS FOR PRODUCING POLYCRYSTALLINE SILICON AND FUMED SILICA

BACKGROUND OF THE INVENTION

This invention relates to a process for producing polycrystalline silicon and, more particularly, to an improved, cost-effective process for producing polycrystalline silicon from silane and fumed silica from silicon tetrachloride.

In known commercial processes for producing polycrystalline silicon (also called polysilicon) from silane ($SiH_4$), a major cost element is the cost of producing silane by either of two commercial production processes, i.e. reduction of silicon tetrafluoride by sodium aluminum hydride ($NaAlH_4$) or redistribution of trichlorosilane produced by high pressure hydrochlorination of metallic silicon and silicon tetrachloride. In the latter process, as practiced commercially, the first step involves the hydrochlorination of silicon tetrachloride in a fluidized bed of silicon to produce the trichlorosilane as the starting material employed in the redistribution reactions. This hydrochlorination reaction carried out at a temperature of 500–550° C. and a pressure of 500 psig is the most costly step of the commercial process for making silane. The trichlorosilane is converted by redistribution to silicon tetrachloride and dichlorosilane which in turn is converted by redistribution to silicon tetrachloride and silane. The silane is then subjected to pyrolysis in either a fixed rod type or fluidized bed reactor to produce polycrystalline silicon and hydrogen. The overall process may be summarized as follows:

1. Hydrochlorination: $3SiCl_4 + 2H_2 + Si \rightarrow 4\ HSiCl3$
2. Redistribution: $2HSiCl_3 \rightarrow SiCl_4 + H_2SiCl_2$
3. Redistribution: $2H_2SiCl_2 \rightarrow SiCl_4 + SiH_4$
4. Pyrolysis: $SiH_4 \rightarrow 2H_2 + Si$ Equations 1, 2 and 3 represent partial reactions. If one recycles all the unreacted starting materials and by-products, a closed loop process is achieved with the overall, net result being the conversion of metallurgical silicon from equation 1 to polycrystalline silicon in equation 4. Thus, the hydrogen and chlorine are merely carriers and, after the initial charge represented by equation 1, only makeup hydrogen and silicon tetrachloride are needed to replenish the processing loss of these two reactants.

It is also known to produce silane by the reaction of metallurgical or impure silicon and hydrogen chloride in a fluidized bed reactor at a temperature of about 300 to 400° C. The reaction produces a high yield (approximately 88%) of trichlorosilane, approximately 10–12% of silicon tetrachloride and minor amounts of dichlorosilane and monochlorosilane. The trichlorosilane is used to make dichlorosilane and silicon tetrachloride and the dichlorosilane produced is further redistributed to make silane as in the previous reaction scheme shown above. The silane is then used to make polycrystalline silicon by pyrolysis. This sequence of reactions may be represented by the following simplified equations:

Trichlorosilane Synthesis:

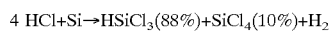

$$4\ HCl + Si \rightarrow HSiCl_3(88\%) + SiCl_4(10\%) + H_2$$

Redistribution Reactions:

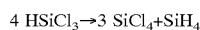

$$4\ HSiCl_3 \rightarrow 3\ SiCl_4 + SiH_4$$

Pyrolysis:

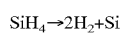

$$SiH_4 \rightarrow 2H_2 + Si$$

This process of producing silane has heretofore not been regarded as a practical commercial process because of the large amount of silicon tetrachloride produced as a by-product even though the hydrochlorination of silicon with HCl to make trichlorosilane can produce the latter at a lower cost than that of the hydrogenation process previously outlined above.

It is also known to produce fumed silica by burning silicon tetrachloride and hydrogen with oxygen in a burner. This combustion process produces fumed silica and hydrogen chloride (HCl).

There is a continuing need to develop more cost efficient processes for producing polycrystalline silicon from silane and fumed silica from silicon tetrachloride.

SUMMARY OF THE INVENTION

Among the several objects of the present invention may be noted the provision of an improved process for producing electronic grade polycrystalline silicon from silane and fumed silica from silicon tetrachloride; the provision of such a process which advantageously utilizes the silicon tetrachloride by-product formed from the production of polycrystalline silicon from silane to produce fumed silica and recycles the hydrogen chloride formed from the production of fumed silica for use in the hydrochlorination of impure silicon; and the provision of such a closed loop process which is practical and cost efficient. Other objects and features will be in part apparent and in part pointed out hereinafter.

Briefly, the present invention is directed to a closed loop process for producing electronic grade polycrystalline silicon from silane and fumed silica from silicon tetrachloride which comprises the following steps:

a) subjecting impure silicon to hydrochlorination with hydrogen chloride to produce trichlorosilane and silicon tetrachloride together with minor amounts of dichlorosilane and monochlorosilane;

b) converting the trichlorosilane to silicon tetrachloride and silane;

c) converting the silane to polycrystalline silicon and hydrogen;

d) reacting the silicon tetrachloride from steps a) and b) with hydrogen and oxygen to produce fumed silica and hydrogen chloride; and e) recycling the hydrogen chloride from step d) for use in step a).

DESCRIPTION OF THE PREFERRED EMBODIMENTS

In accordance with the present invention, it has now been found that electronic grade polycrystalline silicon may be produced from silane and fumed silica produced from silicon tetrachloride in a more cost efficient and practical manner through the use of the silicon tetrachloride by-product from the production of polycrystalline silicon in forming fumed silica and recycling the by-product hydrogen chloride from the production of fumed silica to the process for producing polycrystalline silicon with the plants for producing the respective end products being co-located to facilitate the transfer of the respective by-products in the overall closed loop process.

In carrying out the novel and unique process of the present invention, impure or metallurgical silicon is first subjected to hydrochlorination with hydrogen chloride in a fixed bed or fluidized bed reactor at a temperature in the range of 300 to 400° C. to produce mostly trichlorosilane and silicon tetrachloride together with minor amounts of dichlorosilane and monochlorosilane. Through conventional redistribution reactions or steps, the trichlorosilane is converted to dichlorosilane and silicon tetrachloride and the dichlorosilane is converted to silane. The silane is then converted to electronic grade polycrystalline silicon and hydrogen through pyrolysis in a fluidized bed or fixed rod reactor. In accordance with the invention, instead of subjecting the silicon tetrachloride by-product to high pressure hydrochlorination to convert it back to trichlorosilane, the silicon tetrachloride is transferred to a co-located fumed silica plant where it is reacted by flame pyrolysis with hydrogen and oxygen to produce fumed silica and hydrogen chloride as a by-product. The hydrogen chloride by-product is then returned to the initial step described above and used for hydrochlorination of impure silicon in a fixed bed or fluidized bed reactor.

The steps of the process of the present invention as described above may be represented by the following simplified chemical equations:

Fumed Silica Production:

$$SiCl_4 + 2H_2 + XO_2 \rightarrow SiO_x + 4\ HCl$$

Trichlorosilane Synthesis:

$$4\ HCl + Si \rightarrow HSiCl_3(88\%) + SiCl_4(10\%) + H_2$$

Redistribution Reactions:

$$4\ HSiCl_3 \rightarrow 3\ SiCl_4 + SiH_4$$

Pyrolysis:

$$SiH_4 \rightarrow Si + 2H_2$$

As can be seen, the HCl from the fumed silica production is converted by reaction with impure silicon to trichlorosilane in high yield with a smaller amount of silicon tetrachloride. The trichlorosilane is then redistributed to form silicon tetrachloride and silane which is in turn converted to electronic grade polycrystalline silicon. The silicon tetrachloride and hydrogen by-products thus generated are returned for the step of fumed silica production to form a closed loop process. In this closed loop process, the hydrogen and chlorine are merely carriers. The net overall result of the improved cost-efficient process of the invention is that fumed silica is produced from impure silicon and oxygen and polycrystalline silicon is produced from impure silicon, the silicon tetrachloride, hydrogen and hydrogen chloride by-products being fully utilized through recycling in the closed loop process as described. As is evident, the process of the present invention results in substantial cost savings in the production of silane and in the production of fumed silica through the unique recycling arrangement described.

As various changes could be made in the above process without departing from the scope of the invention, it is intended that all matter contained in the above description shall be interpreted as illustrative and not in a limiting sense.

What is claimed is:

1. A closed loop process for producing electronic grade polycrystalline silicon from silane and fumed silica from silicon tetrachloride comprising the steps of:

a) subjecting impure silicon to hydrochlorination with hydrogen chloride to produce trichlorosilane and silicon tetrachloride together with minor amounts of dichlorosilane and monochlorosilane;

b) converting said trichlorosilane to silicon tetrachloride and silane;

c) converting said silane to polycrystalline silicon and hydrogen;

d) reacting the silicon tetrachloride from steps a) and b) with hydrogen and oxygen to produce fumed silica and hydrogen chloride; and e) recycling the hydrogen chloride from step d) for use in step a).

2. A process as set forth in claim 1 wherein step a) is carried out in a fixed bed or fluidized bed reactor at a temperature of approximately 300–400° C.

3. A process as set forth in claim 1 wherein in step b) said trichlorosilane is first converted to dichlorosilane and silicon tetrachloride and said dichlorosilane is converted to silane.

4. A process as set forth in claim 1 wherein in step c) said silane is converted to electronic grade polycrystalline silicon and hydrogen through pyrolysis in a fluidized bed or fixed rod reactor.

5. A process as set forth in claim 1 wherein the reaction of step d) is carried out by flame pyrolysis of said silicon tetrachloride in the presence of hydrogen and oxygen.

* * * * *